United States Patent
He et al.

(10) Patent No.: US 8,295,330 B2
(45) Date of Patent: Oct. 23, 2012

(54) METHOD AND APPARATUS FOR COMMUNICATION SIGNAL PROCESSING BASED ON MIXED PARAMETRIC AND NON-PARAMETRIC ESTIMATION OF IMPAIRMENT CORRELATIONS

(75) Inventors: Ning He, Sollentuna (SE); Gregory E. Bottomley, Cary, NC (US); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1125 days.

(21) Appl. No.: 12/177,498

(22) Filed: Jul. 22, 2008

(65) Prior Publication Data

US 2010/0020854 A1 Jan. 28, 2010

(51) Int. Cl.
*H04B 1/00* (2006.01)

(52) U.S. Cl. ........ 375/148; 375/260; 375/272; 375/285; 375/343; 375/367

(58) Field of Classification Search .......... 375/148, 375/150, 343, 260, 272, 285, 367; 370/203, 370/208, 209, 320, 335, 342, 441, 479; 455/45, 455/110, 112, 113; 708/250, 256, 314, 422, 708/423, 424, 425, 426
See application file for complete search history.

(56) References Cited

U.S. PATENT DOCUMENTS

| | | | |
|---|---|---|---|
| 6,714,585 B1 | 3/2004 | Wang et al. | |
| 6,975,672 B2 * | 12/2005 | Bottomley et al. | ........... 375/148 |
| 2002/0141486 A1 | 10/2002 | Bottomley et al. | |
| 2004/0202231 A1 | 10/2004 | Wang et al. | |
| 2005/0201447 A1 | 9/2005 | Carins et al. | |
| 2005/0215218 A1 * | 9/2005 | Bottomley et al. | ........ 455/226.1 |
| 2006/0251156 A1 * | 11/2006 | Grant et al. | .................... 375/148 |
| 2008/0130719 A1 | 6/2008 | Bottomley et al. | |

FOREIGN PATENT DOCUMENTS

| WO | WO2005081482 A1 | 9/2005 |
|---|---|---|
| WO | 2006/029789 A1 | 3/2006 |
| WO | 2008-057018 A1 | 5/2008 |

OTHER PUBLICATIONS

Bottomley, G. E. et al. "A Generalized RAKE Receiver for Interference Suppression." IEEE Journal on Selected Areas in Communications, vol. 18, No. 8, Aug. 2000, pp. 1536-1545.

Wang, Y.-P. E. et al. "DS-CDMA Downlink System Capacity Enhancement through Interference Suppression." IEEE Transactions on Wireless Communications, vol. 5, No. 7, Jul. 2006, pp. 1767-1774.

(Continued)

*Primary Examiner* — Dhaval Patel
(74) *Attorney, Agent, or Firm* — Coats & Bennett, P.L.L.C.

(57) ABSTRACT

According to the teachings presented herein, a method and apparatus for communication signal processing advantageously use a mix of parametric and non-parametric correlation estimation in communication signal processing. Non-parametric estimation generates an "overall" correlation estimate for a received communication signal, and parametric estimation generates a "component" correlation estimate. The component correlation estimate is removed from the overall correlation estimate to form a partial correlation estimate that is used to process the received communication signal at least initially, such as in a pre-equalization stage. The overall and component correlation estimates are generated as impairment and/or data correlation estimates.

30 Claims, 5 Drawing Sheets

OTHER PUBLICATIONS

Wang, Y.-P. E., et al. "MLSE and MAP Detectors for High-Data Rate DS-CDMA Reception in Dispersive Channels." 2004 IEEE 60th Vehicular Technology Conference (VTC2004-Fall), vol. 2, Sep. 26-29, 2004, pp. 963-967.

Bottomley, G. E. et al. Co-pending U.S. Appl. No. 11/935,840, filed Nov. 6, 2007 and entitled "Method and Apparatus for Code Power Parameter Estimation for Received Signal Processing."

3GPP TS 25.214, V8.1.0 (Mar. 2008). 3rd Generation Partnership Project; Technical Specification Group Radio Access Network; Physical layer procedures (FDD) (Release 8).

3GPP TS 25.213, V8.0.0 (Mar. 2008). 3rd Generation Partnership Project; Technical Specification Group Radio Access Network; Spreading and modulation (FDD) (Release 8).

Dent, P. W. et al. Co-pending U.S. Appl. No. 12/058,082, filed Mar. 28, 2008 and entitled "A Method and Apparatus for Efficient Multi-Symbol Detection."

Bottomley, G. E. et al. Copending U.S. Appl. No. 12/035,846, filed Feb. 22, 2008 and entitled "A Method and Apparatus for Block-Based Signal Demodulation."

Eriksson, H. B. et al. Copending U.S. Appl. No. 12/022,346, filed Jan. 30, 2008 and entitled "Method of Closed Loop Power Control Adjusted by Self-Interference."

Leou, M.-L., et al. "A Novel Hybrid of Adaptive Array and Equalizer for Mobile Communications." IEEE Transactions on Vehicular Technology, vol. 49, No. 1, Jan. 2000, pp. 1-10.

\* cited by examiner

METHOD AND APPARATUS FOR COMMUNICATION SIGNAL PROCESSING BASED ON MIXED PARAMETRIC AND NON-PARAMETRIC ESTIMATION OF IMPAIRMENT CORRELATIONS

TECHNICAL FIELD

The present invention generally relates to communication signal processing, and particularly relates to processing a received communication signal using a mix of parametrically-estimated and non-parametrically estimated impairment or data correlation estimates.

BACKGROUND

Perhaps no trend in contemporary communication system development is more pronounced than the trend towards higher data rates. Significant development in that regard may be seen in the evolution of wireless communication systems, such as cellular communication networks. For example, significant efforts to increase communication data rates can be seen in Direct Sequence Code Division Multiple Access (DS-CDMA) systems such as Wideband CDMA (WCDMA) with its High Speed Packet Access (HSPA) services, and 1X Evolution Data Only (1XEV-DO) systems with their high-rate packet data services.

Sophisticated receiver design represents a key enabling technology for achieving higher data rates at acceptable performance levels in these types of communication systems. Equalization to combat self interference (inter-symbol interference or "ISI") is needed in dispersive channel environments, for example, to achieve reasonable performance. Linear equalization, such as represented by receiver architectures using "Generalized Rake" (G-Rake) or "Chip Equalization" (CE) processes, becomes insufficient in combating ISI as data rates increase. Newer receiver architectures are thus adopting non-linear equalization processes, such as Decision Feedback Equalization (DFE).

Further, with regard to multi-cell communications, such as found in a WCDMA-based cellular communication network, the presence of high-rate (high-power) transceivers in adjacent cells represents a potentially significant source of Co-Channel Interference (CCI), which also must be suppressed effectively for good receiver performance. The potential lack of signal information complicates the task of CCI suppression. For example, if the other-cell interfering transceivers are not operating in the "active set" of a given transceiver, the given transceiver generally will not have information about the channel delays and coefficients associated with these sources of interference.

If the other-cell users are not in the active set, then information such as channel delays and coefficients will not be available for these sources of interference. As a result, some form of "blind" or non-parametric estimation is needed to address this form of interference.

In general, multiple sources of interference need to be addressed. For complexity reasons, it is convenient to preprocess (pre-equalize) the signal to address one form of interference (e.g. CCI) before processing the signal to address another form of interference (e.g. ISI). Ideally, for performance, the pre-equalizer should only suppress CCI, leaving the ISI alone. Thus, one challenge for the pre-equalizer is to suppress one form of interference but not the other.

SUMMARY

According to the teachings presented herein, a method and apparatus for communication signal processing advantageously use a mix of parametric and non-parametric correlation estimation in communication signal processing. Non-parametric estimation generates an "overall" correlation estimate for a received communication signal, and parametric estimation generates a "component" correlation estimate for a component of the received signal. The component correlation estimate is removed from the overall correlation estimate to form a partial correlation estimate that is used to process the received communication signal at least initially, such as in a pre-equalization stage. The overall and component correlation estimates are generated as impairment correlation estimates and/or data correlation estimates.

In one such embodiment, non-parametric estimation generates overall impairment correlations for all types of interference present in a received communication signal, while parametric estimation generates impairment correlations for at least one particular type of interference. The parametric impairment correlation estimate is removed from the non-parametric correlation estimate to form a partial impairment correlation estimate that excludes at least one particular type of interference. The partial impairment correlation estimate is used to suppress the non-excluded types of interference, such as in the first equalization stage of a two-stage demodulator, while subsequent processing is used to suppress the excluded type(s) of interference, such as in a second equalization stage.

However, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
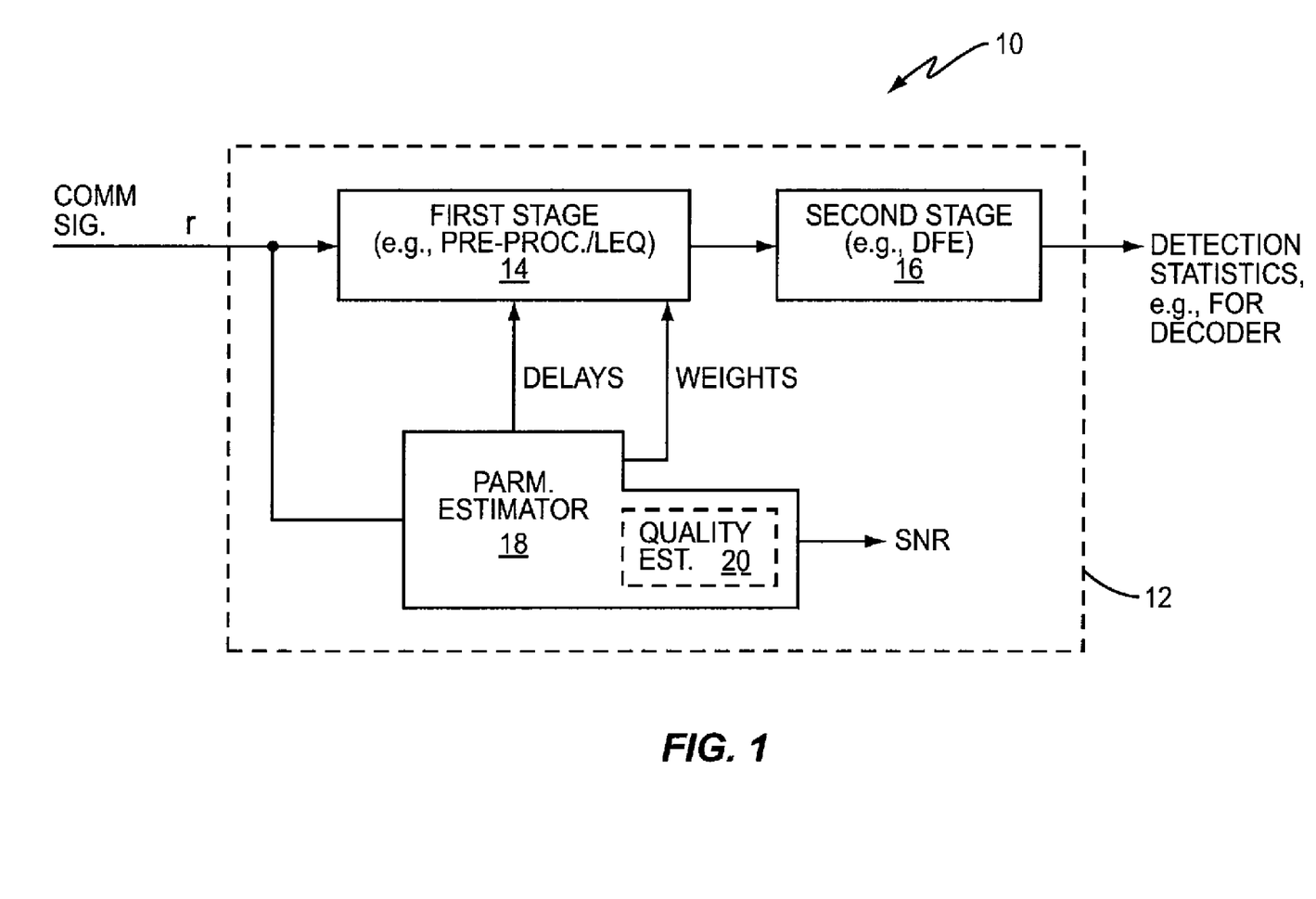
FIG. 1 is block diagram of one embodiment of a receiver circuit according to teachings presented herein.

FIG. 1 illustrates one embodiment of a receiver circuit 10, e.g., a demodulation circuit, for processing a received communication signal as taught herein. One or more processing circuits 12 are configured to non-parametrically generate an overall impairment or data correlation estimate including overall impairment in the communication signal, and parametrically generate a component impairment or signal correlation estimate for a particular component of the received signal. The processing circuits 12 are further configured to form a partial impairment or data correlation estimate by removing the component correlation estimate from the overall correlation estimate, and to process the communication signal based on the partial correlation estimate.

The correlations of interest herein are, in one or more embodiments, taken between or among a set of processing delays, e.g., equalizer filter taps or Rake finger delays, used for coherently processing the received communication signal. Further, the teachings herein apply to the case where the overall correlation estimate is generated as an overall impairment correlation estimate that reflects the correlation of overall impairment in the received communication signal. Overall impairment may include the net or combined effect of multiple types of interference and noise. Similarly, the component correlation estimate can be generated as a component impairment correlation estimate that reflects one or more particular types of impairment, rather than the overall impairment. In such embodiments, the partial correlation estimate comprises a partial impairment correlation estimate obtained by removing the component impairment correlation estimate from the overall impairment correlation estimate.

Those skilled in the art will also appreciate that the teachings herein apply directly to the case where the overall correlation estimate is generated as an overall data correlation estimate. In such cases, the overall data correlation estimate reflects the overall correlations—desired signal and impairment correlations—between data samples, e.g., "chip" samples or despread values of the received communication signal. Correspondingly, the component correlation estimate can be generated as an impairment correlation estimate (e.g., for a self-interference component of the overall impairment) or as a component of the overall data correlation estimate. In that case, the component correlation estimate may be referred to as a component data correlation estimate, denoting that it reflects one or more components of the overall data correlations (e.g., self-interference and desired signal correlations).

Thus, the partial correlation estimate can be formed as a partial impairment correlation estimate (e.g., overall interference minus self-interference) or as a partial data correlation estimate (e.g., overall data correlations minus self interference correlations). Broadly, processing a received communication signal may include non-parametrically generating an overall correlation estimate that captures overall data or impairment correlations for the received communication signal, and parametrically generating a component correlation estimate for one or more particular components of the overall data or impairment correlations. Such processing continues with forming a partial correlation estimate by removing the component correlation estimate from the overall correlation estimate, and processing the received communication signal based on the partial correlation estimate, e.g., performing initial equalization of the received communication signal based on the partial correlation estimate.

To simplify the discussion, the below details focus primarily on generating overall impairment correlation estimates and generating component impairment estimates, but those skilled in the art should understand that data correlation estimates also could be used. With that in mind, an embodiment of the receiver circuit 10 comprises a two-stage equalization circuit for demodulating a received communication signal. For example, in the illustration, one sees that the one or more processing circuits 12 comprise a first processing stage 14 for initially processing (pre-processing) the received communication signal, a second processing stage 16 for further processing of the received communication signal, and a parameter estimator 18.

In one or more embodiments, the parameter estimator 18 is configured to compute the overall impairment correlation estimate, the component impairment correlation estimate, and the partial impairment correlation estimate. The parameter estimator 18 is also configured to configure/support the two-stage processing by computing processing delays for coherently processing multipath samples of the communication signal, by computing combining weights as a function of the partial impairment correlation estimate for initial interference suppression, and, optionally, by computing a signal quality estimate (signal-to-noise ratio or SNR) for the communication signal as a function of partial impairment correlation estimate. The parameter estimator 18 thus may include (at least functionally) a signal quality estimator 20. SNR computation in this manner can yield improved closed-loop power control for the communication signal, as described later.

In at least one embodiment, the second equalization stage provides good interference suppression for a particular type (or types) of interference; however, the performance of that second equalization stage is improved by pre-equalizing communication signal values input to it, to suppress other types of interference. For example, the second stage 16 may comprise a non-linear equalizer, such as a Decision Feedback Equalizer (DFE), which may be configured for symbol-block based equalization, such as disclosed in the co-pending U.S. application Ser. No. 12/035,846, which was filed on 22 Feb. 2008, and which is commonly owned with the instant application.

In at least some instances, one may assume that the type of interference best suppressed in the second equalization stage is well suited for parametric modeling, while one or more of the other types of interference are not well suited for parametric modeling—e.g., because of unknown characteristics or excess modeling complexity. For example, the second stage 16 may be configured to provide good suppression of self-interference or same-cell interference in a received cellular communication signal. As a general proposition, self- or same-cell interference is well suited for parametric characterization, but the received communication signal may also be impaired by other-cell interference, which may not be well suited for parametric characterization because of unknown spreading codes, propagation channel characteristics, etc.

Advantageously, then, the receiver circuit 10 blindly estimates (non-parametric estimation) overall impairment correlations for the communication signal, thereby capturing the combined effects of all types of interference in the communication signal. It further parametrically estimates component impairment correlations for the type of interference that is better handled in the subsequent second stage of the receiver circuit 10. The receiver circuit 10 then forms a partial impairment correlation estimate by "removing" the component impairment correlation estimate from the overall impairment correlation estimate. Here, the term "removing" connotes an operation, such as subtraction, whereby the receiver circuit 10 eliminates (at least substantially) the impairment correlations associated with the particular type of interference that will be suppressed in second stage processing from the overall impairment correlations. Again, the blindly estimated overall impairment correlation estimate captures the effects of that particular type of interference in combination with all other types of interference present in the communication signal. As such, the partial impairment correlation estimate includes blindly estimated impairment correlation values for those types of interference not parametrically estimated and removed from it.

The receiver circuit 10 thus uses the partial impairment correlation estimate in initial communication signal processing in the first stage 14, to suppress those types of interference not excluded from the partial impairment correlation estimate via the parametric estimation and removal process. Such pre-processing allows subsequent processing in the second stage 16 to suppress the type(s) of interference excluded from the partial impairment correlation estimate.

With the above example details in mind, one embodiment of the receiver circuit 10 comprises a demodulator including the parameter estimator 18, which is configured to generate the overall impairment correlation estimate and the component impairment correlation estimate, and to form the partial impairment correlation estimate. The receiver circuit 10 also includes a first equalizer (stage 14) to suppress forms of interference represented in the partial impairment correlation estimate, and a second equalizer (stage 16) to suppress forms of interference not represented in the partial impairment correlation estimate. The parameter estimator 18 may include the signal quality estimator 20, which may be configured to estimate an SNR for the (received) communication signal based on the partial impairment correlation estimate. In so doing, the SNR reflects suppression of those forms of interference represented in the partial impairment correlation estimate.

Further, in at least one such embodiment, the receiver circuit 10 is configured to equalize the communication signal in a first equalization stage (stage 14) based on the partial impairment correlation estimate, to suppress interference not associated with the particular component of the overall impairment. The receiver circuit 10 is further configured to equalize the communication signal in a subsequent, second equalization stage (stage 16), to suppress interference associated with the particular component of the overall impairment, i.e., the component of interference excluded from the partial impairment correlation estimate via the parametric estimation and removal process described above. Of course, parametric correlation estimates may be generated for more than one particular component of the overall impairment, and the partial impairment correlation estimate may exclude more than one type of interference, and subsequent processing may therefore be configured to suppress more than one type of interference.

In any case, in one or more embodiments, the first equalization stage of the receiver circuit 10 comprises a linear equalizer, e.g., stage 14 is configured as a linear equalizer. Here, the receiver circuit 10 is configured to equalize the communication signal in the first equalization stage by deriving combining weights from the partial impairment correlation estimate and combining signal samples obtained from the communication signal according to the combining weights, in a chip-level or symbol-level linear equalization process. Correspondingly, in one or more embodiments, the second equalization stage of the receiver circuit 10 comprises a non-linear equalizer, e.g., the second stage 16 comprises a non-linear equalizer. In such embodiments, the receiver circuit 10 is configured to equalize the communication signal in the second equalization stage by processing equalized values output from the first equalization stage in a non-linear equalization process, to produce symbol detection statistics for symbol decoding.

Regardless of the particular processing stage implementation details, the receiver circuit 10 is configured in one or more embodiments to non-parametrically generate the overall impairment correlation estimate by making correlation measurements for the communication signal and blindly estimating the overall impairment or data correlation based on the correlation measurements. In one embodiment, the receiver circuit 10 non-parametrically generates the overall data correlation estimate by computing data correlations between data samples (chip samples) of the communication signal. In another embodiment, the receiver circuit 10 non-parametrically generates the overall impairment correlation estimate by computing impairment correlations between pilot-symbol-removed pilot values despread from the communication signal, e.g., from a common pilot channel encoded within the communication signal. In another embodiment, the receiver circuit 10 non-parametrically generates the overall impairment correlation estimate by computing impairment correlations between "traffic" symbols despread from one or more unused spreading codes of the communication signal.

As for distinguishing the above non-parametric estimation from parametric estimation, one may refer to U.S. application Ser. No. 10/800,167, filed on 12 Mar. 2004 and which is commonly owned with the instant application. The '167 application, now published as U.S. Pub. 2005/0201447 A1, provides detailed information for one or more embodiments of parametric estimation as contemplated herein. Broadly, parametric estimation is based on a parametric model that includes one or more model terms scaled by parameters that weight each model term's contribution to the overall parameterized estimate. The model terms each represent the correlation of impairment for a particular type of interference across coherent processing delays of interest, e.g., the correlation of impairment across Rake fingers, across equalization filter taps, etc.

Figure 2:
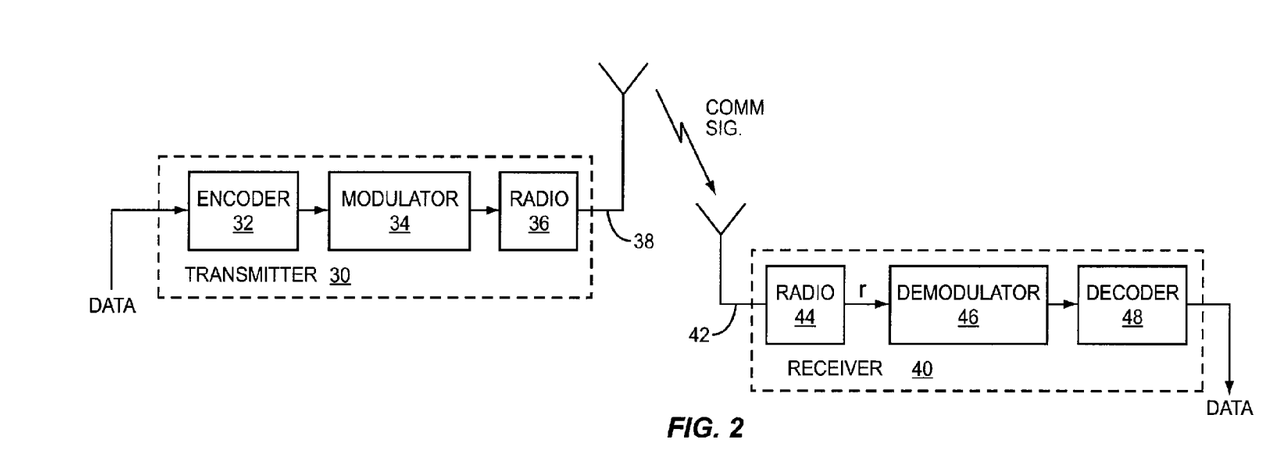
FIG. 2 is a block diagram of one embodiment of a communication system, including a transmitter and a receiver, wherein the receiver incorporates an embodiment of the receiver circuit.

Before discussing more detailed aspects of parametric estimation, it may be helpful to refer momentarily to FIG. 2, which illustrates one embodiment of a transmitter 30 that includes an encoder 32, a modulator 34, a radio transmitter 36, and one or more transmit antennas 38. The figure also illustrates one embodiment of a receiver 40 that includes one or more antennas 42, a radio receiver 44, a demodulator 46, and a decoder 48. An embodiment of the above-described receiver circuit 10 is included in or otherwise comprises the demodulator 46.

At the transmitter 30, data (information symbols) is optionally encoded using a forward-error-correction (FEC) encoder 32, such as a convolutional encoder or turbo-code encoder. The resulting modem bits are provided to the modulator 34, where modem symbols are formed (e.g. QPSK, 16-QAM) and used to modulate spreading waveforms. These spreading waveforms are then modulated onto a radio carrier in the radio transmitter 36 and transmitted from the one or more transmit antennas 38 as a communication signal. The transmitted communication signal passes through a transmission medium, such as a multipath fading channel, and arrives at the one or more receive antennas 42 of the receiver 40.

The received communication signal, which may comprise a composite of one or more antenna-received and/or multipath received signal components, is processed by the front-end radio receiver 44, which mixes it down to baseband and digitizes it. The baseband signal representing the one or more receive antennas 42 is provided to the demodulator 46, which recovers hard or soft information regarding the modem bits or modem symbols. (Note that the "received communication signal" at the demodulator 46, denoted as signal "r" in the drawing, is a down-converted and sampled (digitized) representation of the antenna-received communication signal propagated from the transmitter 30 to the receiver 40.) This modem information is provided to the decoder 48, which recovers the information bits, e.g., the originally transmitted data.

Figure 3:
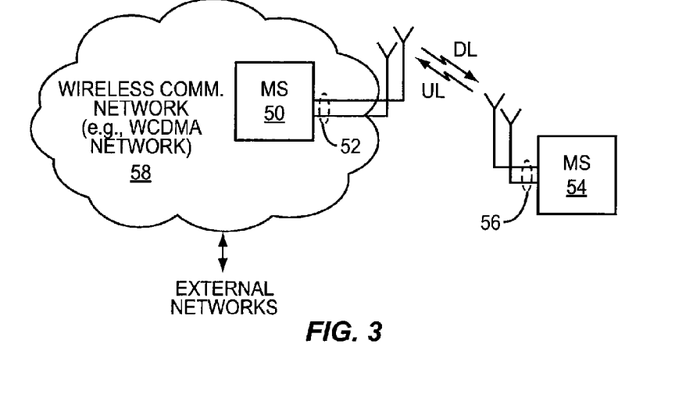
FIG. 3 is a block diagram of one embodiment of cellular communication network, including a cellular base station, wherein the illustrated base station and/or the illustrated mobile station include an embodiment of the receiver circuit.

As an example, such data may control signaling and/or data traffic transmitted on the uplink (UL) and/or on the downlink (DL) of a wireless communication network, e.g., a cellular communication network such as a Wideband CDMA (WCDMA) network. FIG. 3 illustrates such an example, wherein the receiver 40 is implemented in a base station 50, which transmits DL communication signals via one or more antennas 52, to a mobile station 54 that receives the DL signals via one or more antennas 56. Likewise, the base station 50 receives UL communication signals on its antenna(s) 52, as transmitted by the mobile station 54 and, generally, as transmitted by any number of mobile stations operating within or around the "cell" (coverage area) of the base station 50. Indeed, the base station 50 may be one of potentially many geographically dispersed base stations within a larger wireless communication network 58, which communicatively couples the mobile station 54 to one or more external networks, such as the Internet or other public or private data networks.

In at least one embodiment contemplated herein, the wireless communication network 58 comprises a WCDMA-based cellular communication network, and the base station 50 and mobile station 54 correspondingly are WCDMA-based. In particular, the base station 50 provides High Speed Packet Access (HSPA) services and the mobile station 54 likewise is configured for HSPA operation. In this context, the base station 50 includes one or more "copies" of the receiver 40, including the demodulator 46, for processing UL HSPA signals received from the mobile station 54, and any number of additional mobile stations being supported by the base station 50.

Further, in at least one such embodiment, the demodulator 46 is configured to use the advantageous mix of parametric and non-parametric impairment correlation estimation as taught herein to provide interference suppression in a first processing stage that excludes the suppression of self-interference, and to provide self-interference suppression in a second processing stage. The performance of the second stage is improved by the first stage suppression of forms of interference other than self-interference.

Thus, referring back to FIG. 1 for advantageous implementation details of a base station demodulation circuit, one sees that baseband chip samples of a received UL communication signal are provided to the parameter estimator 18. The parameter estimator 18 estimates processing delays (which may include propagation delays) to be used for coherent processing of the communication signal, and estimates weights for use by the first processing stage 14, which comprises a linear pre-equalizer (LPE) in one or more embodiments. Processing via the LPE suppresses co-channel interference and optionally despreads symbols as well. That is, the received communication signal in one or more embodiments is a Direct Sequence Code Division Multiple Access (DS-CDMA) signal and the LPE optionally despreads that signal on one or more channelization codes of interest to obtain despread symbol values.

Figure 4:
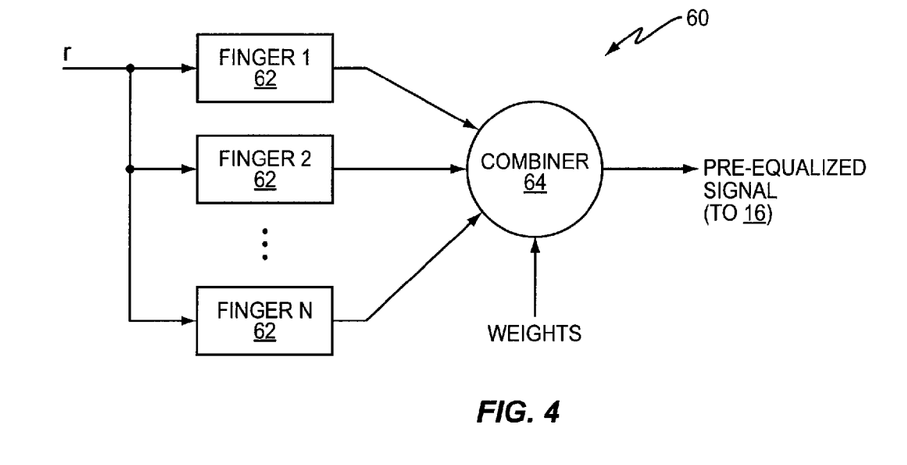
FIG. 4 is a block diagram of one embodiment of a Generalized Rake (G-Rake) circuit, as is implemented in an initial processing stage in one or more embodiments of the receiver circuit.

The LPE in one or more embodiments may be a symbol-level equalizer such as a Generalized Rake (G-Rake) receiver, which despreads and then combines. See, for example, FIG. 4, which partially illustrates a G-Rake receiver circuit 60 implemented within the first stage 14 of the receiver circuit 10 in one or more embodiments. The G-Rake receiver circuit 60 includes a plurality of Rake fingers 62, each of which operates as a time-aligned correlator that despreads the received communication signal at an assigned delay offset ("placement") for a particular CDMA code channel. The finger output signals from fingers 1 . . . N are combined in a combiner 64, according to combining weights computed as a function of the partial impairment correlation estimate, thereby suppressing those types of interference represented in the partial impairment correlation estimate—i.e., those types of interference captured in the overall impairment correlation estimate and not subsequently excluded via the parametric estimation and removal as described above.

In one or more other embodiments, the LPE comprises a chip-level equalizer such as a Minimum Mean Square Error (MMSE) chip equalizer, which combines and then optionally despreads. See, for example, FIG. 5, which at least partially illustrates a chip-equalizer implementation of the first stage 14 of the receiver circuit 10 in one or more embodiments. The illustrated chip equalizer circuit 70 includes a delay register 72 (e.g., a shift register) having a series of delay stages 74 (e.g., stages 1 . . . M) through which successive chip samples of the received communication signal are propagated.

Figure 5:
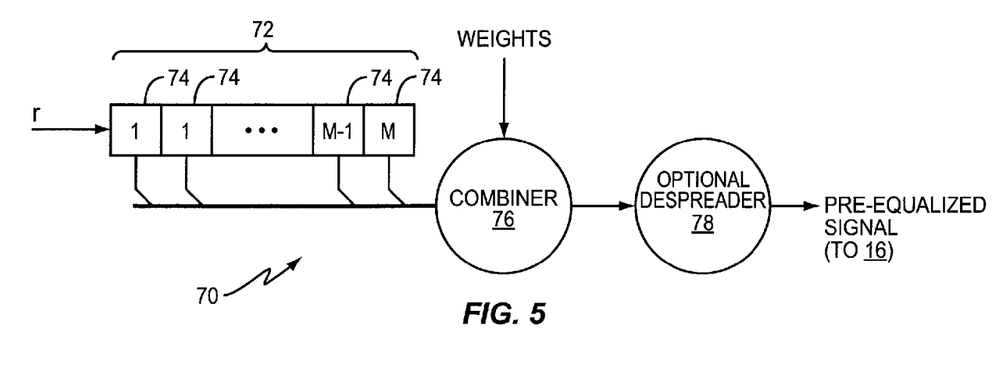
FIG. 5 is a block diagram of one embodiment of a chip equalization circuit, as is implemented in an initial processing stage in one or more embodiments of the receiver circuit.

Each delay stage 74 provides an output signal (filter tap) and these output signals are combined in a combiner 76 according to combining weights computed as a function of the partial impairment correlation estimates. Note that the particular filter taps that are combined in combiner 76 can be determined by which taps have non-zero weighting applied to them. Thus, selecting the filter taps to combine and determining the (complex) values of the weights applied to those taps determine the equalization filter response, and use of the partial impairment correlation estimate provides for suppression (whitening) of those types of interference not excluded from the partial impairment correlation estimate.

In either of the above cases, the processing delays at issue represent those delays used for coherently combining chip-level or symbol-level samples obtained from the communication signal. For G-Rake implementations, the overall impairment correlation estimate, the component impairment correlation estimate, and the partial impairment correlation estimate, all reflect impairment correlations between the symbol-level values at the finger outputs, i.e., cross-correlations between the finger samples. For chip-equalizer implementations, the correlation estimates at issue here reflect impairment correlations between the chip-level values (chip samples) at the filter taps of the delay register 72.

For the G-Rake case, the output of the first stage 14 thus is initial symbol estimates that are provided to the second stage 16, which is in one or more embodiments configured as a symbol-level non-linear equalizer. For the chip-equalizer case, the output of the first stage also may be initial symbol estimates (taken from correlator 78 in FIG. 5). Alternatively, the first stage 14 may be configured as a chip equalizer but may provide chip-level outputs (as weighted combinations from the combiner 76 in FIG. 5) that are not despread. In this case, the second stage 16, e.g., configured as a nonlinear equalizer, operates on pre-equalized chip samples.

Broadly, in at least one embodiment, the receiver circuit 10 is configured to process the received communication signal by generating, for further processing, equalized chip samples or initial symbol estimates in a chip equalization process having chip equalization filter weights derived from the partial impairment correlation estimate. In one or more other embodiments, the receiver circuit 10 is configured to process the communication signal by generating, for further processing, initial symbol estimates in a G-Rake receiver process having Rake finger combining weights based on the partial impairment correlation estimate.

Correspondingly, non-linear equalization configurations of the second stage 16 can be implemented as a chip-level or symbol-level non-linear equalizer. Many types of non-linear equalizers are known and include decision feedback equalizers (DFEs), maximum-likelihood sequence estimators (MLSEs) and maximum a posteriori (MAP) equalizers. For reasonable complexity, a preferred form in one or more embodiments is the block DFE equalizer, with either conventional detection (single signal/code) or joint detection. An advantageous arrangement for block DFE (BDFE) and joint detection appears in the previously mentioned U.S. application Ser. No. 12/035,846.

Figure 6:
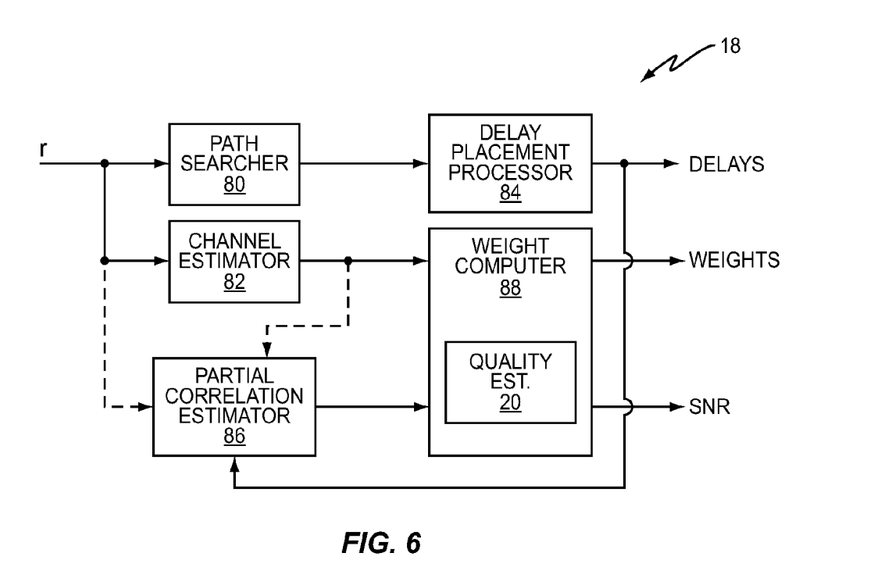
FIG. 6 is a block diagram of one embodiment of the parameter estimator disclosed for the receiver circuit.

For ease of description in a non-limiting example, detailed operations are described with respect to a symbol-level (Rake structure) LPE as the first stage implementation. FIG. 6 illustrates an embodiment of the parameter estimator for implementation in a Rake-based embodiment of the receiver circuit 10. A path searcher 80 determines path delays, and a channel estimator 82 determines channel coefficients. Correspondingly, a delay placement processor 84 determines finger or tap placements (processing delays) based on the path delays. Typically delays correspond to propagation path delays (multipath delays) with the addition of "extra" delays to help equalize the channel.

A partial correlation estimator 86 estimates data or impairment partial correlations across processing delays. These partial correlation estimates, along with channel coefficient estimates, are used to compute weights and SNR similar to the way full correlation estimates are used, as described in the previously identified U.S. application Ser. No. 10/800,167. However, according the teachings presented herein a parametric approach is used to estimate partial correlations.

To understand this in more detail, it helps to understand the parametric approach for estimating full correlations. In such approaches, a power estimator is used to estimate signal and noise powers. These powers are used to scale corresponding correlation terms determined by a structured element calculator. That is, the parametric model of impairment correlations includes one or more structured elements, each corresponding to impairments arising from a particular source (e.g., type of interference), and each scaled by a scaling factor. These scaled terms are added together to form full correlation estimates that represent the overall impairment correlations for a given signal. Again, background details for parametric estimation can be found in U.S. application Ser. No. 10/800,167, and in the co-pending and commonly owned U.S. application Ser. No. 10/412,504, filed on 11 Apr. 2003, and published as U.S. Pub. 2004/0202231 A1.

However, according to the present teachings, a weight computer 88 computes weights for chip-level or symbol-level combining of communication signal values as a function of a partial impairment correlation estimate formed by removing a parametrically estimated component impairment correlation estimate from a non-parametrically estimated overall impairment correlation estimate. More particularly, in at least one embodiment, parametric estimation retains one term of a parametric model, where that term corresponds to the particular type of interference to be excluded from the partial impairment correlation estimate.

Figure 7:
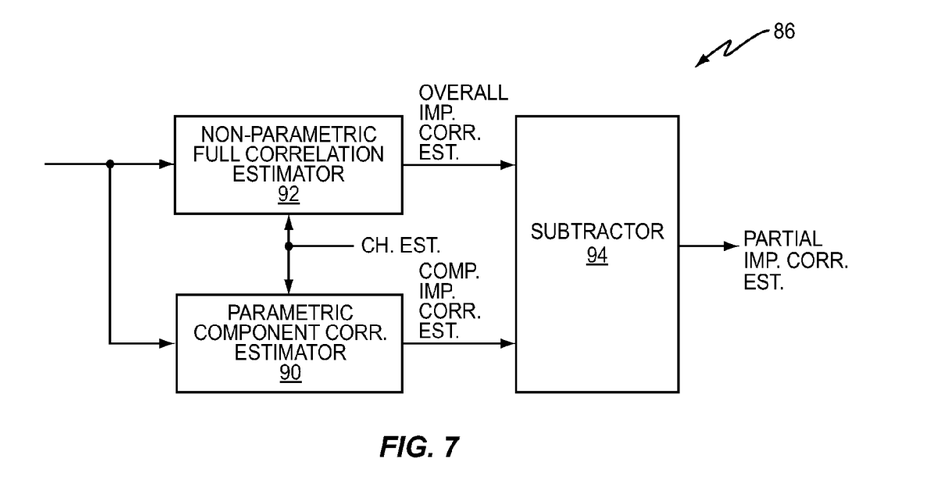
FIG. 7 is a block diagram for one embodiment of the partial impairment correlation estimator disclosed for the receiver circuit.

One embodiment of the partial correlation estimator 86 as contemplated herein is shown in FIG. 7. A parametric partial correlation estimator 90 is used to estimate partial impairment correlations due to self interference in the communication signal. That is, the parametric partial correlation estimator 90, also referred to as a component impairment correlation estimator, parametrically estimates impairment correlations for a component of the overall impairments; here, it generates a parametric estimate of impairment correlations arising from self-interference. Note that the parametric partial correlation estimator 90 may generate a full parametric estimate, including parametric estimates for multiple types of interference, but in such cases would be configured to output only those parametric estimates of interest, e.g., the parametrically estimated term for self-interference.

Contrary to the particularized component estimation of the parametric partial correlation estimator 90, a non-parametric correlation estimator 92 is used to estimate full impairment or data correlations for the communication signal using a non-parametric approach. Thus, the non-parametric correlation estimator 92, also referred to as the overall impairment correlation estimator, outputs an overall impairment correlation estimate based on blindly estimating impairment correlations arising from the combined effects of all forms of interference in the communication signal.

The partial impairment correlation estimate desired for first stage processing thus is obtained by subtracting the component impairment correlation estimate (output by estimator 90) from the overall impairment correlation estimate (as output by estimator 92). That is, the subtractor 94 subtracts or otherwise removes the component impairment correlation estimate from the overall impairment correlation estimate, to produce the partial impairment correlation estimate used for initially processing the communication signal in the first stage 14 of the receiver circuit 10.

For the estimator 92, there are at least three approaches for non-parametrically generating the overall impairment or data correlation estimate. In a first embodiment, the estimator 92 estimates the overall data correlation estimate using data correlations measured between chip samples of the communication signal (the channel coefficients are not needed). In a second embodiment, it non-parametrically generates the overall impairment correlation estimate using pilot-symbol-removed correlations measured between pilot despread values (the chip samples may not be needed if the channel estimator 82 provides pilot despread values as well as channel estimates). In a third embodiment, it non-parametrically estimates the overall impairment correlation using correlations measured between despread values obtained from one or more unused spreading/channelization codes of the communication signal (the channel coefficients are not needed).

Mathematically, the partial correlation estimate can be expressed as $$R_{partial} = R_{nonparametric} - \alpha R_{ISI} \qquad \text{Eq. (1)}$$

where $R_{nonparametric}$ is the non-parametrically generated overall correlation estimate output by the estimator 92 (embodied as a covariance matrix), $\alpha$ is the signal power estimate (parametric model fitting parameter) such as described in U.S. application Ser. No. 10/800,167, and $R_{ISI}$ is a structure element corresponding to self-interference, also as described in the '167 application. Note that Eq. (1) in terms of practical implementation can be subject to various restrictions. For instance, the implementation may include a check that assures that $R_{partial}$ is positive semi-definite. Of course such a check can be realized in different ways. Regardless of whether such checks are implemented, $R_{ISI}$ is the component impairment correlation estimate output by the estimator 90, which in one or more embodiments is the appropriate scaled parametric model term corresponding to self-interference. Thus, subtraction of $\alpha R_{ISI}$ from $R_{nonparametric}$ produces the partial correlation estimate, $R_{partial}$. Note that, as with $R_{nonparametric}$, $R_{partial}$ and $R_{ISI}$ are also embodied as covariance matrices. Note also that when the overall correlation estimate is a data correlation estimate, it may be advantageous to parametrically remove both the ISI term and the desired signal term of the form $\alpha hh^H$, where h is a vector of net channel coefficients.

One subtle, but important issue to consider when forming the partial correlation estimate is the need of the fitting parameter α. In a "standard" embodiment of a parametric G-Rake receiver, the α parameter (a scaling factor) is obtained by postulating a full parametric model of the covariance matrix (including α), and then estimating the parameters in the model by adapting the model to measured impairment correlations in a least squares or other fitting process. Obviously the parametric model used depends on the scenario that is considered. In its simplest form the model contains only two parameters (α and β). For example, in a simple parametric estimation for use in a cellular communication network, one might implement $$\hat{R}_{measured} = \alpha R_{ISI} + \beta R_n \quad \text{Eq. (2)}$$

where the parametric model term $R_n$ is a structured element modeling impairment correlations arising from other-cell interference plus noise, the parametric model term $R_{ISI}$ is a structured element modeling impairment correlations arising from own-cell or self interference, and $\hat{R}_{measured}$ represents directly calculated overall impairment correlation, such as may be determined, albeit generally with some noise, from received pilot symbols. Each such term is a covariance matrix having row/column dimensions set according to the number of processing delays for which impairment correlations are being estimated.

In operation, the parametric model is "fitted" to the measured impairment correlation by adaptively adjusting the α and β parameters, e.g., to minimize the mean square error between the observed impairment correlations as represented in $\hat{R}_{measured}$ and the parametric model.

However, this approach becomes potentially problematic for scenarios where at least some types of interference in the received communication signal should be excluded from initial suppression processing, in favor of better suppression in subsequent downstream processing, and/or where the overall interference is too complex to model parametrically, or where parametric modeling is not appropriate because of unknown interference characteristics. For example, in the developing WCDMA standards, HSPA operation in the uplink will result in potentially significant CCI, where high-rate/high-power mobile stations in one cell interfere with base station reception of mobile station signals in another cell.

Thus, estimation of the parameter α using known parametric model fitting procedures may be biased, owing to incomplete or inaccurate accounting for CCI in the parametric estimation process. An advantageous approach to determining α is contemplated herein, which circumvents the need of explicitly estimating the fitting parameter α. That is, for WCDMA/HSPA embodiments, the teachings presented herein advantageously recognize that $\alpha R_{ISI}$ can be obtained by exploring the relationship between the Dedicated Physical Control Channel (DPCCH) symbol energy, E, and the chip energy, $E_c$. This relation is given by $$E = \gamma S_f E_c \quad \text{Eq. (3)}$$

where $S_f$ is the spreading factor (256) and γ represents how much of the total energy that is spent on the DPCCH. Then, assuming that γ is known, one can form $$\hat{R}'_{ISI} = \frac{1}{\gamma S_f} \hat{R}_{ISI} \quad \text{Eq. (4)}$$

where $$\hat{R}_{ISI} = R_{ISI}(\hat{g}) \quad \text{Eq. (5)}$$

where Eq. (5) is the conventional estimate of $R_{ISI}$ based on the medium channel response estimate $\hat{g}$, which may be determined from the DPCCH. Note that other teachings herein provide for determining $R_{ISI}$ as a function of net channel responses, $\hat{h}$. As is well understood, the net channel responses represent the end-to-end channel response, including the effect of transmit/receiver pulse shaping filters on noise, while the medium channel responses represent the propagation channel itself. A transformation matrix based on filter pulse autocorrelations and differences between the actual propagation path delays and the processing delays may be used to transform net channel responses into medium channel responses. Alternatively, $R_{ISI}$ can be determined directly from net channel responses as described in the co-pending and commonly owned U.S. patent application filed on 5 Jun. 2008, identified by application Ser. No. 12/133,636, and entitled "Method and Apparatus for Efficient Estimation of Interference in a Wireless Receiver."

In any case, it can be shown that $$\hat{R}'_{ISI} \approx \alpha R_{ISI} \quad \text{Eq. (6)}$$

which is precisely what is needed to form the partial covariance matrix (1). That is, Eq. (1) may be rewritten as $$R_{partial} = R_{nonparametric} - \hat{R}'_{ISI} \quad \text{Eq. (7)}$$

A key assumption in implementing Eq. (7) is that γ is known. Advantageously, the teachings presented herein recognize that γ is known (or readily knowable within the receiver circuit 10) at least for WCDMA/HSPA embodiments, because it depends on the "beta" weights and the number of used codes. Such information is known to the base station 50, a "NodeB" in WCDMA parlance, after demodulation of the E-TFCI (and TFCI if the DPDCH is configured). More specifically, the base station 50 can be configured to calculate γ as $$\gamma = \beta_c^2 / (\beta_c^2 + \beta_{ec}^2 + \Sigma \beta_{ed}^2 + \beta_d^2 + \beta_{hs}^2). \quad \text{Eq. (8)}$$

Note that the betas in Eq. (8) are not to be confused with the parameter β shown in Eq. (2) as a scaling factor for parametric model fitting of the structured element $R_n$. Instead, these betas are taken from the nomenclature used in the relevant WCDMA technical specifications, 3GPP TS 25.213, entitled "Spreading and Modulation (FDD)," and 3GPP TS 25.214, entitled "Physical Layer Procedures (FDD)."

With this example in mind, it will be appreciated that the communication signal may be any type of DS-CDMA signal received in given cell of a cellular communication network, and that the receiver circuit 10 may be correspondingly configured to parametrically generate the component impairment correlation estimate by determining the component impairment correlation estimate based on a parametric model for self-interference in the DS-CDMA signal. The receiver circuit 10 may be configured to determine a parametric model term for the self-interference based at least in part on one of medium channel response estimates $\hat{g}$, or net channel response estimates $\hat{h}$. More particularly, the receiver circuit 10 may be configured to determine a parametric scaling or weighting value for the parametric model term based on known transmit power relationships for code channels included within the DS-CDMA signal—e.g., the above-described betas, or by performing a full parametric model fitting, e.g., by performing the fitting shown in Eq. (2). This latter approach may be less desirable because of the aforementioned bias arising from CCI not accounted for in the parametric model.

Thus, the α parameter may be determined based on explicit knowledge or based on fitting the parametric model term for self-interference ($R_{ISI}$) and one or more additional parametric model terms for one or more additional interference components to correlation measurements made for the communication signal, i.e., to $R_{measured}$. As a further alternative contemplated herein for WCDMA/HSPA embodiments, the receiver circuit 10 can be configured to obtain γ without explicit knowledge of the beta weights (without using TFCI information). Instead the beta weights are estimated from the power ratios between the different physical channels (e.g. DPCCH, DPDCH and E-DPDCH).

In any case, SNR estimation and power control is one application of partial impairment correlation estimate as regards processing the received communication signal. For example, in at least one embodiment, processing the communication signal as a function of the partial impairment correlation estimate, $R_{partial}$, comprises the receiver circuit determining a received signal quality measurement as a function of the partial impairment correlation estimate, for sending back power control feedback to a transmitter originating the communication signal. Where the receiver circuit 10 comprises the demodulator 46 in the base station 50, or is otherwise included therein, it determines an SNR for a received UL signal from the mobile station 54. In one such embodiment, the SNR is computed as $$SNR = \frac{(w^H h)^2}{w^H R_{partial} w}, \qquad \text{Eq. (9)}$$

where h is a vector of estimated net channel coefficients, and w is vector of combining weights. Such an approach yields more stable power control under at least some operating circumstances. Note, too, that the "noise" relevant to the SNR of Eq. (9) is any impairment present in the communication signal that is not excluded from the partial impairment correlation estimate. More precisely, in at least one embodiment, the noise is just those impairments remaining by virtue of removing the component correlation estimate from the overall correlation estimate. For example, if the component correlation estimate is a component impairment correlation estimate for ISI, then the noise relevant to the calculation would exclude ISI.

Of course, in the same or other embodiments, processing the communication signal as a function of the partial impairment correlation estimate additionally or alternatively comprises pre-equalizing the communication signal in the first stage 14 of the receiver circuit 10, to simplify further equalization in the second stage 16 of the receiver circuit 10. Particularly, the first stage 14 may be configured as an LPE, as discussed above, and the second stage may be configured as a non-linear equalizer, also as discussed above. Broadly, according to the teachings presented herein, a pre-equalizer may be used prior to a nonlinear equalizer to simplify the nonlinear equalizer. The pre-equalizer may reduce the amount of data processed (by combining antenna signals and/or over-sampled data) or may simplify nonlinear equalizer design (by whitening noise and other interference). By way of non-limiting example, the second stage 16 may be configured as essentially any type of nonlinear equalizer, including a DFE, a maximum-likelihood sequence estimator (MLSE), or a maximum a posteriori symbol estimator (MAP equalizers).

Of particular interest for one or more embodiments is the block DFE described in the previously mentioned application Ser. No. 12/035,846. In the '846 application, a symbol-level BDFE is described which operates on Rake-combined values. According to the teachings presented herein, these Rake combined values can be replaced with pre-equalized combined values from the first stage 14, which suppress other interference but not self-interference. That leaves the BDFE implementation of the second stage 16 for advantageous suppression of self-interference. In this regard, the pre-equalized combined values of the communication signal as output by the first stage 14 may be referred to as "G-Rake±" values. Here, the "±" notation indicates that the combining weights generated from the partial impairment correlation estimate, $R_{partial}$, excludes one or more types of interference. Indeed, it is a broad aspect of the teachings herein to use a mixture of non-parametric and parametric estimation to form partial correlation estimates that exclude a certain form of interference (e.g., self interference). The correlations can be used for weight computation or signal quality estimation for power control.

Figure 8:
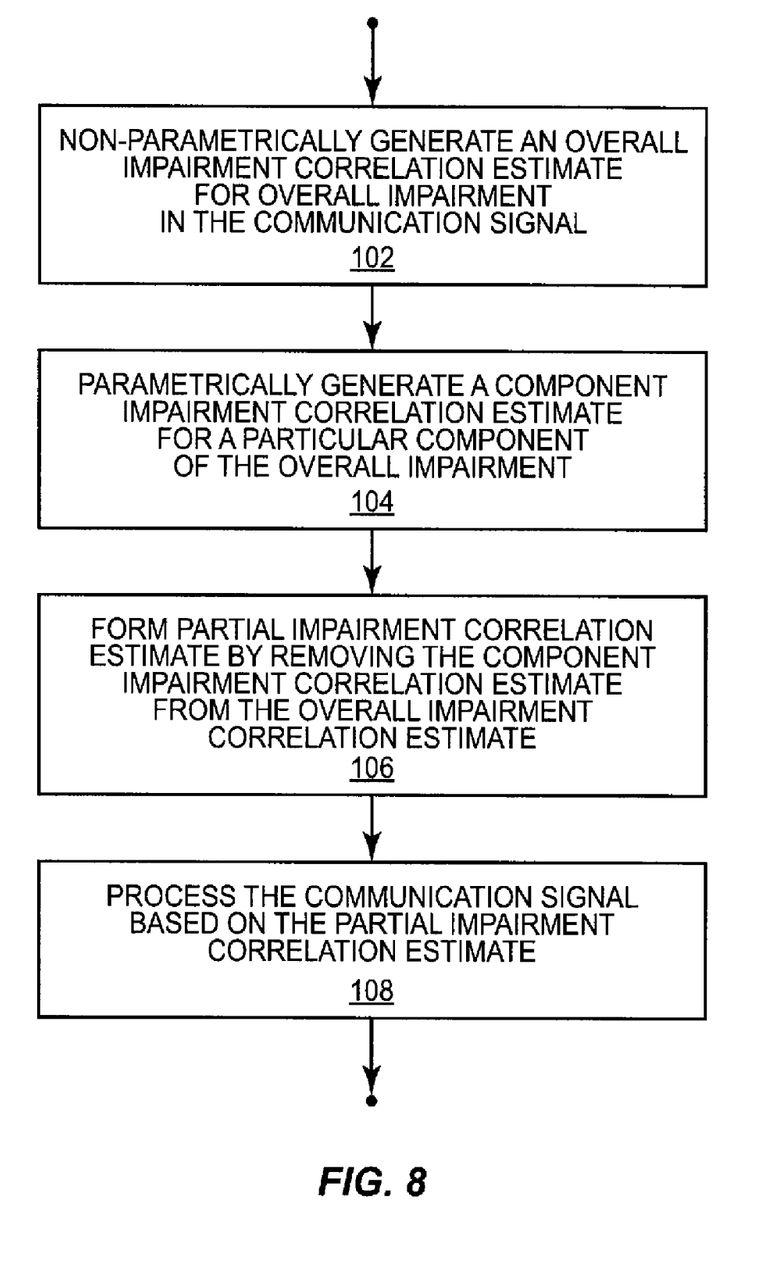
FIG. 8 is a logic flow diagram for one embodiment of a method of processing a received communication signal based on partial impairment correlation estimates, as taught herein.

FIG. 8 illustrates one embodiment of such a method. It should be understood that the method can be implemented in the receiver circuit 10 by way of hardware, software, or any combination of both. For example, in one or more embodiments, the one or more processing circuits 12 of the receiver circuit 10—as shown in FIG. 1—include one or more microprocessor-based circuits, e.g., at least one digital signal processor. As such, all or part of the illustrated method can be implemented in stored computer program instructions held in a memory device in or otherwise accessible to the receiver circuit 10. "Live" operation of the receiver circuit 10 thus would include execution of the stored program instructions. In other embodiments, the receiver circuit 10 includes signal processing hardware to carry out all or part of the method.

Further, note that the method operations are illustrated sequentially for discussion, and the sequence shown is not limiting. That is, at least some of the illustrated operations can be performed in other sequences or together in parallel. Moreover, one or more of the illustrated operations may be performed in conjunction with other processing, and may be performed on an ongoing basis, such as on a per transmission time interval basis (TTI) in a WCDMA embodiment. Further, any combination of foregoing and background processing may be used. Note, too, that the aforementioned memory element or other storage element may be used to store parametric modeling information.

With these qualifications in mind, the method 100 of FIG. 8 "begins" with non-parametrically generating an overall impairment correlation estimate for overall impairment in the communication signal (Block 102), and continues with parametrically generating a component impairment correlation estimate for a particular component of the overall impairment (Block 104). Processing continues with forming a partial impairment correlation estimate by removing the component impairment correlation estimate from the overall impairment correlation estimate (Block 106), and processing the communication signal based on the partial impairment correlation estimate (Block 108).

As noted, processing the communication signal may comprise equalizing the communication signal in a first equalization stage based on the partial impairment correlation estimate, to suppress interference not associated with the particular component of the overall impairment. Such processing may be followed by further equalizing the output from the first equalization stage in a second equalization stage, to produce symbol detection statistics for decoding.

With the above non-limiting examples in mind, the present invention is not limited to the foregoing discussion and accompanying drawings. Instead, the present invention is limited only by the following claims and their legal equivalents.

What is claimed is:

1. A method of processing a received communication signal comprising:
    non-parametrically generating an overall correlation estimate including overall impairment in the communication signal;
    parametrically generating a component correlation estimate for a particular component of the received communication signal;
    forming a partial correlation estimate by removing the component correlation estimate from the overall correlation estimate; and
    processing the communication signal based on the partial correlation estimate.

2. The method of claim 1, wherein non-parametrically generating an overall correlation estimate including overall impairment in the communication signal comprises non-parametrically generating an overall correlation estimate that captures overall data or impairment correlations for the received communication signal, and parametrically generating a component correlation estimate for a particular component of the received communication signal comprises parametrically generating a component correlation estimate for one or more particular components of the overall data or impairment correlations.

3. The method of claim 1, wherein said processing the communication signal comprises equalizing the communication signal in a first equalization stage based on the partial correlation estimate, to suppress interference not associated with the particular component of the received communication signal.

4. The method of claim 3, further comprising equalizing the communication signal in a subsequent, second equalization stage, to suppress interference associated with the particular component of the received signal.

5. The method of claim 4, wherein said equalizing the communication signal in the first equalization stage comprises deriving combining weights from the partial correlation estimate, and combining signal samples obtained from the communication signal according to the combining weights in a symbol-level or chip-level linear equalization process.

6. The method of claim 5, wherein said equalizing the communication signal in the second equalization stage comprises processing equalized values output from the first equalization stage in a non-linear equalization process, to produce detection statistics for decoding.

7. The method of claim 1, wherein said non-parametrically generating the overall correlation estimate comprises making correlation measurements for the communication signal and blindly estimating the overall impairment or data correlation based on the correlation measurements.

8. The method of claim 7, wherein the communication signal is a DS-CDMA signal received in a given cell of a cellular communication network, and wherein said parametrically generating the component correlation estimate comprises determining the component correlation estimate based on a parametric model for self-interference in the DS-CDMA signal.

9. The method of claim 8, further comprising determining a parametric model term for the self-interference based at least in part on one of medium channel response estimates, or net channel response estimates.

10. The method of claim 8, further comprising determining a parametric scaling or weighting value for the parametric model term based on known transmit power relationships for code channels included within the DS-CDMA signal, or based on estimating transmit power relationships for code channels within the DS-CDMA signal, or based on fitting the parametric model term for self-interference and one or more additional parametric model terms for one or more additional interference components to correlation measurements made for the communication signal.

11. The method of claim 1, wherein said processing the communication signal comprises generating, for further processing, equalized chip samples or initial symbol estimates in a chip equalization process having chip equalization filter weights derived from the partial correlation estimate.

12. The method of claim 1, wherein said processing the communication signal comprises generating, for further processing, initial symbol estimates in a Generalized Rake receiver process having Rake finger combining weights based on the partial correlation estimate.

13. The method of claim 1, wherein said processing the communication signal comprises determining a received signal quality measurement as a function of the partial correlation estimate, for sending back power control feedback to a transmitter originating the communication signal.

14. A communication node including a receiver circuit for processing a received communication signal comprising one or more processing circuits configured to:
    non-parametrically generate an overall impairment or data correlation estimate including overall impairment in the communication signal;
    parametrically generate a component correlation estimate for a particular component of the received signal;
    form a partial impairment or data correlation estimate by removing the component correlation estimate from the overall correlation estimate; and
    process the communication signal based on the partial correlation estimate.

15. The communication node of claim 14, wherein the receiver circuit is configured to non-parametrically generate an overall correlation estimate including overall impairment in the communication signal by non-parametrically generating an overall correlation estimate that captures overall data or impairment correlations for the received communication signal, and is configured to parametrically generate a component correlation estimate for a particular component of the received communication signal by parametrically generating a component correlation estimate for one or more particular components of the overall data or impairment correlations.

16. The communication node of claim 14, wherein the receiver circuit comprises part of a cellular communication base station receiver, or part of a cellular communication mobile station receiver, and wherein the communication signal is a received cellular communication signal.

17. The communication node of claim 14, wherein the receiver circuit comprises a demodulator including a parameter estimator to generate the overall correlation estimate and the component correlation estimate, and to form the partial correlation estimate, a first equalizer to suppress forms of interference represented in the partial correlation estimate, and a second equalizer to suppress forms of interference not represented in the partial correlation estimate.

18. The communication node of claim 17, wherein the parameter estimator includes a signal quality estimator that estimates a signal-to-noise ratio for the communication signal based on the partial correlation estimate.

19. The communication node of claim 14, wherein the receiver circuit is configured to equalize the communication signal in a first equalization stage based on the partial correlation estimate, to suppress interference not associated with the particular component of the overall impairment.

20. The communication node of claim 19, wherein the receiver circuit is configured to equalize the communication signal in a subsequent, second equalization stage, to suppress interference associated with the particular component of the received signal.

21. The communication node of claim 20, wherein the first equalization stage of the receiver circuit comprises a linear equalizer, and wherein the receiver circuit is configured to equalize the communication signal in the first equalization stage by deriving combining weights from the partial correlation estimate and combining signal samples obtained from the communication signal according to the combining weights, in a chip-level or symbol-level linear equalization process.

22. The communication node of claim 21, wherein the second equalization stage comprises a non-linear equalizer, and wherein the receiver circuit is configured to equalize the communication signal in the second equalization stage by processing equalized values output from the first equalization stage in a non-linear equalization process, to produce detection statistics for decoding.

23. The communication node of claim 14, wherein the receiver circuit is configured to non-parametrically generate the overall correlation estimate by making correlation measurements for the communication signal and blindly estimating the overall correlation based on the correlation measurements.

24. The communication node of claim 23, wherein the communication signal is a DS-CDMA signal received in a given cell of a cellular communication network, and wherein the receiver circuit is configured to parametrically generate the component correlation estimate by determining the component correlation estimate based on a parametric model for self-interference in the DS-CDMA signal.

25. The communication node of claim 24, wherein the receiver circuit is configured to determine a parametric model term for the self-interference based at least in part on one of medium channel response estimates, or net channel response estimates.

26. The communication node of claim 24, wherein the receiver circuit is configured to determine a parametric scaling or weighting value for the parametric model term based on known transmit power relationships for code channels included within the DS-CDMA signal, or based on estimating transmit power relationships for code channels within the DS-CDMA signal, or based on fitting the parametric model term for self-interference and one or more additional parametric model terms for one or more additional interference components to correlation measurements made for the communication signal.

27. The communication node of claim 14, wherein the receiver circuit is configured to process the communication signal by generating, for further processing, equalized chip samples or initial symbol estimates in a chip equalization process having chip equalization filter weights derived from the partial correlation estimate.

28. The communication node of claim 14, wherein the receiver circuit is configured to process the communication signal by generating, for further processing, initial symbol estimates in a Generalized Rake receiver process having Rake finger combining weights based on the partial correlation estimate.

29. The communication node of claim 14, wherein the receiver circuit is configured to process the communication signal by determining a received signal quality measurement as a function of the partial correlation estimate, for sending back power control feedback to a transmitter originating the communication signal.

30. The communication node of claim 14, wherein the communication node comprises a base station node in a wireless communication network, or a mobile station node operating in a wireless communication network.

* * * * *